(12) United States Patent
Sebastian et al.

(10) Patent No.: US 12,538,943 B2
(45) Date of Patent: Feb. 3, 2026

(54) NONWOVEN POUCH COMPRISING HEAT SEALABLE BINDER FIBER

(71) Applicant: R.J. REYNOLDS TOBACCO COMPANY, Winston-Salem, NC (US)

(72) Inventors: Andries Don Sebastian, Kathleen, GA (US); Alton Busbee, Lexington, NC (US); Jeremy Barrett Mabe, Lexington, NC (US); Yan Pu, Raleigh, NC (US); Eric Taylor Hunt, Pfafftown, NC (US); Bruce Alan Bengtsson, Winston-Salem, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 47 days.

(21) Appl. No.: 17/889,889

(22) Filed: Aug. 17, 2022

(65) Prior Publication Data

US 2022/0386689 A1     Dec. 8, 2022

Related U.S. Application Data

(63) Continuation of application No. 17/196,770, filed on Mar. 9, 2021, now Pat. No. 11,793,235, which is a
(Continued)

(51) Int. Cl.

| | |
|---|---|
| *A24F 23/02* | (2006.01) |
| *A24B 13/00* | (2006.01) |
| *B65B 9/067* | (2012.01) |
| *B65B 29/02* | (2006.01) |
| *B65B 51/10* | (2006.01) |

(Continued)

(52) U.S. Cl.
CPC .............. *A24F 23/02* (2013.01); *A24B 13/00* (2013.01); *B65B 9/067* (2013.01); *B65B 29/02* (2013.01); *B65B 51/10* (2013.01); *B65B 61/06* (2013.01); *B65D 65/46* (2013.01); *B65D 85/808* (2013.01); *D04H 1/425* (2013.01); *D04H 1/435* (2013.01); *D04H 1/49* (2013.01); *D04H 1/54* (2013.01); *D04H 1/55* (2013.01)

(58) Field of Classification Search
None
See application file for complete search history.

(56) References Cited

U.S. PATENT DOCUMENTS

| | | |
|---|---|---|
| 2,475,241 A | 7/1949 | Hermanson |
| 3,338,992 A | 8/1967 | Kinney |
| (Continued) | | |

FOREIGN PATENT DOCUMENTS

| | | |
|---|---|---|
| EP | 1 926 401 | 6/2008 |
| EP | 2 343 995 | 7/2011 |
| (Continued) | | |

*Primary Examiner* — Katherine A Will
(74) *Attorney, Agent, or Firm* — Womble Bond Dickinson (US) LLP

(57) ABSTRACT

A pouched product adapted for release of a water-soluble component therefrom is provided herein. The pouched product can include an outer water-permeable pouch defining a cavity containing a composition that includes a water-soluble component capable of being released through the water-permeable pouch and has a surface area, wherein the outer water-permeable pouch can include a nonwoven web including a plurality of heat sealable binder fibers blended with a second plurality of dissimilar fibers. The nonwoven web can be carded, hydroentangled and point bonded.

20 Claims, 3 Drawing Sheets

Related U.S. Application Data continuation of application No. 14/484,956, filed on Sep. 12, 2014, now Pat. No. 10,959,456.

(51) Int. Cl.

| | | |
|---|---|---|
| *B65B 61/06* | (2006.01) | |
| *B65D 65/46* | (2006.01) | |
| *B65D 85/808* | (2006.01) | |
| *D04H 1/425* | (2012.01) | |
| *D04H 1/435* | (2012.01) | |
| *D04H 1/49* | (2012.01) | |
| *D04H 1/54* | (2012.01) | |
| *D04H 1/55* | (2012.01) | |

(56) References Cited

U.S. PATENT DOCUMENTS

| | | |
|---|---|---|
| 3,341,394 A | 9/1967 | Kinney |
| 3,502,763 A | 3/1970 | Hartmann |
| 3,542,615 A | 11/1970 | Dobo et al. |
| 3,692,618 A | 9/1972 | Dorschner et al. |
| 3,734,812 A | 5/1973 | Yazawa |
| 3,802,817 A | 4/1974 | Matsuki et al. |
| 3,849,241 A | 11/1974 | Butin et al. |
| 3,949,111 A | 4/1976 | Pelletier |
| 3,972,759 A | 8/1976 | Buntin |
| 4,340,563 A | 7/1982 | Appel et al. |
| 4,607,479 A | 8/1986 | Linden |
| 4,622,259 A | 11/1986 | McAmish et al. |
| 4,631,899 A | 12/1986 | Nielsen |
| 4,907,605 A | 3/1990 | Ray et al. |
| 5,167,244 A | 12/1992 | Kjerstad |
| 5,200,246 A | 4/1993 | Sabee |
| 5,334,446 A | 8/1994 | Quantrille et al. |
| 7,498,281 B2 | 3/2009 | Iwasaki et al. |
| 7,861,728 B2 | 1/2011 | Holton, Jr. et al. |
| 7,946,295 B2 | 5/2011 | Brinkley et al. |
| 7,950,399 B2 | 5/2011 | Winterson et al. |
| 8,067,046 B2 | 11/2011 | Schleef et al. |
| 8,741,348 B2 | 6/2014 | Hansson et al. |
| 9,044,049 B2 | 6/2015 | Winterson et al. |
| 9,402,809 B2 | 8/2016 | Axelsson et al. |
| 2004/0118422 A1 | 6/2004 | Lundin et al. |
| 2004/0121689 A1 | 6/2004 | Anderson et al. |
| 2005/0053665 A1 | 3/2005 | Ek et al. |
| 2005/0061339 A1 | 3/2005 | Hansson et al. |
| 2005/0178398 A1 | 8/2005 | Breslin et al. |
| 2006/0019570 A1 | 1/2006 | Groten et al. |
| 2007/0012328 A1 | 1/2007 | Winterson et al. |
| 2007/0062549 A1 | 3/2007 | Holton, Jr. et al. |
| 2007/0186941 A1 | 8/2007 | Holton, Jr. et al. |
| 2008/0085649 A1 | 4/2008 | Salamero et al. |
| 2008/0156338 A1 | 7/2008 | Winterson et al. |
| 2008/0202536 A1 | 8/2008 | Torrence et al. |
| 2008/0249492 A1 | 10/2008 | Schmidt |
| 2009/0025738 A1 | 1/2009 | Mua et al. |
| 2009/0113852 A1 | 5/2009 | Cecil et al. |
| 2009/0258559 A1 | 10/2009 | Anantharamaiah et al. |
| 2009/0293895 A1 | 12/2009 | Axelsson et al. |
| 2010/0018539 A1 | 1/2010 | Brinkley et al. |
| 2010/0059069 A1 | 3/2010 | Boldrini |
| 2010/0061940 A1 | 3/2010 | Axelsson et al. |
| 2010/0071711 A1 | 3/2010 | Boldrini |
| 2010/0101189 A1 | 4/2010 | Boldrini |
| 2010/0101588 A1 | 4/2010 | Boldrini et al. |
| 2010/0199601 A1 | 8/2010 | Boldrini et al. |
| 2010/0200005 A1 | 8/2010 | Fallon |
| 2010/0218779 A1 | 9/2010 | Zhuang et al. |
| 2010/0252056 A1 | 10/2010 | Gruss et al. |
| 2010/0260690 A1 | 10/2010 | Kristensen et al. |
| 2010/0294291 A1 | 11/2010 | Robinson et al. |
| 2010/0300465 A1 | 12/2010 | Zimmermann |
| 2010/0330236 A1 | 12/2010 | Miyahara et al. |
| 2011/0041860 A1 | 2/2011 | Essén et al. |
| 2011/0061666 A1 | 3/2011 | Dube et al. |
| 2011/0180087 A1 | 7/2011 | Gee et al. |
| 2011/0239591 A1 | 10/2011 | Gruss et al. |
| 2011/0247640 A1 | 10/2011 | Beeson et al. |
| 2011/0268809 A1 | 11/2011 | Brinkley et al. |
| 2011/0284016 A1 | 11/2011 | Günter et al. |
| 2011/0303232 A1 | 12/2011 | Williams |
| 2011/0303511 A1 | 12/2011 | Brinkley et al. |
| 2012/0031416 A1 | 2/2012 | Atchley et al. |
| 2012/0051672 A1 | 3/2012 | Foss et al. |
| 2012/0055493 A1 | 3/2012 | Novak, III et al. |
| 2012/0055494 A1 | 3/2012 | Hunt et al. |
| 2012/0067362 A1 | 3/2012 | Mola |
| 2012/0085360 A1 | 4/2012 | Kawata et al. |
| 2012/0103349 A1 | 5/2012 | Hansson |
| 2012/0103353 A1 | 5/2012 | Sebastian et al. |
| 2012/0237640 A1 | 9/2012 | Buffet et al. |
| 2012/0247492 A1 | 10/2012 | Kobal et al. |
| 2013/0098377 A1 | 4/2013 | Borschke et al. |
| 2013/0118512 A1 | 5/2013 | Jackson et al. |
| 2013/0152953 A1 | 6/2013 | Mua et al. |
| 2013/0206150 A1 | 8/2013 | Duggins et al. |
| 2013/0206153 A1 | 8/2013 | Beeson et al. |
| 2013/0340773 A1 | 12/2013 | Sebastian et al. |
| 2014/0026912 A1 | 1/2014 | Rushforth et al. |
| 2014/0083438 A1 | 3/2014 | Sebastian et al. |
| 2014/0141677 A1 | 5/2014 | Tai et al. |
| 2014/0255452 A1 | 9/2014 | Reddick et al. |

FOREIGN PATENT DOCUMENTS

| | | |
|---|---|---|
| GB | 2 319 265 | 5/1998 |
| WO | WO 2005/063060 | 7/2005 |
| WO | WO 2008/056135 | 5/2008 |
| WO | WO 2008/146160 | 12/2008 |
| WO | WO 2010/031552 | 3/2010 |
| WO | WO 2012/134380 | 10/2012 |

NONWOVEN POUCH COMPRISING HEAT SEALABLE BINDER FIBER

CROSS-REFERENCE TO RELATED APPLICATIONS

The present application is a continuation of U.S. patent application Ser. No. 17/196,770, filed Mar. 9, 2021, which is a continuation of U.S. patent application Ser. No. 14/484,956, filed Sep. 12, 2014, the disclosures of which are incorporated herein by reference in their entirety.

FIELD OF INVENTION

The present disclosure relates to a pouched product adapted for oral use and a method of manufacturing thereof. In certain embodiments, the present invention relates to products made or derived from tobacco, or that otherwise incorporate tobacco, and are intended for human consumption.

BACKGROUND

Certain types of pouches or sachets have been employed to contain compositions adapted for oral use. For example, tobacco can be enjoyed in a so-called smokeless form. Particularly popular smokeless tobacco products are employed by inserting some form of processed tobacco or tobacco-containing formulation into the mouth of the user. See for example, the types of representative smokeless tobacco products, as well as the various smokeless tobacco formulations, ingredients and processing methodologies, referenced in the background art set forth in U.S. Pat. Pub. Nos. 2011/0303511 to Brinkley et al. and 2013/0206150 to Duggins et al.; which are incorporated herein by reference. During use, those pouches or sachets are inserted into the mouth of the user, and water soluble components contained within those pouches or sachets are released as a result of interaction with saliva.

Certain commercially available smokeless tobacco products, such as products commonly referred to as "snus," comprise ground tobacco materials incorporated within sealed pouches. Representative types of snus products have been manufactured in Europe, particularly in Sweden, by or through companies such as Swedish Match AB (e.g., for brands such as General, Ettan, Goteborgs Rape and Grovsnus); Fiedler & Lundgren AB (e.g., for brands such as Lucky Strike, Granit, Krekt and Mocca); JTI Sweden AB (e.g., for brands such as Gustavus) and Rocker Production AB (e.g., for brands such as Rocker). Other types of snus products have been commercially available in the U.S.A. through companies such as Philip Morris USA, Inc. (e.g., for brands such as Marlboro Snus); U.S. Smokeless Tobacco Company (e.g., for brands such as SKOAL Snus) and R. J. Reynolds Tobacco Company (e.g., for brands such as CAMEL Snus). See also, for example, Bryzgalov et al., 1N1800 Life Cycle Assessment, Comparative Life Cycle Assessment of General Loose and Portion Snus (2005); which is incorporated herein by reference.

Various types of snus products, as well as components for those products and methods for processing components associated with those products, have been proposed. See, for example, U.S. Pat. No. 8,067,046 to Schleef et al. and U.S. Pat. No. 7,861,728 to Holton, Jr. et al.; US Pat. Pub. Nos. 2004/0118422 to Lundin et al.; 2008/0202536 to Torrence et al.; 2009/0025738 to Mua et al.; 2011/0180087 to Gee et al.; 2010/0218779 to Zhuang et al.; 2010/0294291 to Robinson et al.; 2010/0300465 to Zimmermann; 2011/0061666 to Dube et al.; 2011/0303232 to Williams et al.; 2012/0067362 to Mola et al.; 2012/0085360 to Kawata et al.; 2012/0103353 to Sebastian et al. and 2012/0247492 to Kobal et al.; and PCT Pub. Nos. WO 05/063060 to Atchley et al. and WO 08/56135 to Onno; which are incorporated herein by reference. In addition, certain quality standards associated with snus manufacture have been assembled as a so-called GothiaTek standard. Furthermore, various manners and methods useful for the production of snus types of products have been proposed. See, for example, U.S. Pat. No. 4,607,479 to Linden and U.S. Pat. No. 4,631,899 to Nielsen; and US Pat. Pub. Nos. 2008/0156338 to Winterson et al.; 2010/0018539 to Brinkley et al.; 2010/0059069 to Boldrini; 2010/0071711 to Boldrini; 2010/0101189 to Boldrini; 2010/0101588 to Boldrini; 2010/0199601 to Boldrini; 2010/0200005 to Fallon; 2010/0252056 to Gruss et al.; 2011/0284016 to Gunter et al.; 2011/0239591 to Gruss et al.; 2011/0303511 to Brinkley et al.; 2012/0055493 to Novak III et al. and 2012/0103349 to Hansson et al.; and PCT Pub. Nos. WO 2008/081341 to Winterson et al. and WO 2008/146160 to Cecil et al.; which are incorporated herein by reference. Additionally, snus products can be manufactured using equipment such as that available as SB 51-1/T, SBL 50 and SB 53-2/T from Merz Verpackungmaschinen GmBH.

Certain types of products employing pouches or sachets that contain tobacco substitutes (or combinations of tobacco and tobacco substitutes) also have been proposed. See, for example, U.S. Pat. No. 5,167,244 to Kjerstad and U.S. Pat. No. 7,950,399 to Winterson et al.; and US Pat. Pub. Nos. 2005/0061339 to Hansson et al.; 2011/0041860 to Essen et al. and 2011/0247640 to Beeson et al.; which are incorporated herein by reference.

Certain types of product employing pouches or sachets have been employed to contain nicotine, such as those used for nicotine replacement therapy (NRT) types of products (e.g., a pharmaceutical product distributed under the tradename ZONNIC® by Niconovum AB). See also, for example, the types of pouch materials and nicotine-containing formulations set forth in U.S. Pat. No. 4,907,605 to Ray et al.; US Pat. Pub. Nos. 2009/0293895 to Axelsson et al. and 2011/0268809 to Brinkley et al.; and PCT Pub. Nos. WO 2010/031552 to Axelsson et al. and WO 2012/134380 to Nilsson; which are incorporated herein by reference.

To manufacture pouched products of the type noted above, the pouches must be sealed after being filled with the desired material. As noted in US Pat. Pub. No. 2014/0026912 to Rushforth et al., such sealing is typically accomplished by application of a binder material to the fiber network, which enables the pouch to be sealed upon application of heat. However, conventional binders applied to such fibrous pouches, such as acrylic polymers, are costly to apply to pouches and inhibit biodegradability of the discarded pouch.

It would be desirable to provide a pouched product, particularly one adapted for oral use, wherein the nonwoven fabric used to form the pouched product exhibits favorable characteristics such as enhanced biodegradability and reduced cost to manufacture.

SUMMARY OF THE INVENTION

The present invention relates to a pouched product adapted for release of a water-soluble component therefrom, wherein the pouched product can include an outer water-permeable pouch defining a cavity containing a composition comprising a water-soluble component capable of being released through the water-permeable pouch and having a surface area. In various embodiments, a pouched product configured for insertion into the mouth of a user of that product is provided, wherein the pouched product can include an outer, water-permeable pouch defining a cavity that can contain a composition adapted for oral use. In certain embodiments, the composition within the cavity of the pouch can contain a tobacco-derived product, such as a particulate tobacco material, nicotine, particulate non-tobacco material (e.g., microcrystalline cellulose) that has been treated to contain nicotine and/or flavoring agents, and fibrous plant material (e.g., beet pulp fiber) treated to contain a tobacco extract. In various embodiments, the composition within the cavity of the pouch is a smokeless tobacco product or nicotine replacement therapy product. In some embodiments, the composition within the cavity of the pouch can be a particulate material adapted for steeping or brewing (i.e., configured for liquid extraction), such as a tea or coffee material. Accordingly, in certain embodiments, the composition within the cavity of the pouch can comprise a particulate or fibrous plant material such as would be found in various teas or tea variants. In some embodiments, the composition within the cavity can comprise a flavor component such that flavor can be added to a liquid (e.g., water).

The outer pouch can be formed from a nonwoven web that exhibits acceptable taste and other sensory characteristics. Specifically, the nonwoven web can include a plurality of heat sealable binder fibers blended with a second plurality of dissimilar fibers. In a preferred embodiment, the plurality of heat sealable binder fibers and/or the second plurality of dissimilar fibers are in staple fiber form. The plurality of heat sealable binder fibers can be used in place of a binder material to heat seal the pouched product after the composition adapted for oral use has been inserted into the cavity of the pouched product.

In various embodiments of the present invention, the nonwoven web can be carded, hydroentangled and point bonded. As used herein, the term "point bonded" refers to a process of bonding fibers by partially or completely melting a nonwoven web at discrete points. Point bonding can include, but is not limited to, bonding via calendar rolls with an embossed and/or engraved pattern, ultrasonic bonding, and the like. In various embodiments of the present invention, the point bonding can occur over less than about 60% of the surface area of the pouch. The weight ratio of the heat sealable binder fibers to the second plurality of fibers can be about 4:1 to about 1:4, or about 3:1 to about 1:3, for example. In some embodiments, the nonwoven web can be substantially free of a binder coating.

In various embodiments, the heat sealable binder fibers can have a melting point of less than about 230° C., less than about 200° C., less than about 160° C., or less than about 140° C. In some embodiments, the heat sealable binder fibers can comprise a biodegradable polymer. For example, the heat sealable binder fibers can comprise an aliphatic polyester. In certain embodiments, the heat sealable binder fibers can comprise a polymer selected from the group consisting of polyglycolic acid, polylactic acid, polyhydroxyalkanoates, polycaprolactone, polybutylene succinate, polybutylene succinate adipate, and copolymers thereof.

The second plurality of fibers is typically dissimilar from the heat sealable binder fibers. In other words, the second plurality of fibers can be formed from a different material and have different properties as compared to the heat sealable binder fibers. For example, in some embodiments, the second plurality of fibers can comprise cellulosic fibers.

In a preferred embodiment of the present invention, the heat sealable binder fibers can comprise an aliphatic polyester and the second plurality of dissimilar fibers can comprise cellulosic fibers. Furthermore, the composition within the cavity of the pouch can be a smokeless tobacco product or nicotine replacement therapy product.

In various embodiments of the pouched product described herein, the heat sealable binder fibers can be in the form of multicomponent fibers comprising a heat sealable binder polymer exposed on at least a portion of each multicomponent fiber and a second polymer having a melting point at least about 10° C. greater or at least about 20° C. greater than the heat sealable binder polymer. The multicomponent fibers can comprise an outer sheath or matrix component and an inner island or core component such that the fibers are in a sheath/core or islands-in-the-sea arrangement, wherein the outer sheath or matrix component comprises the heat sealable binder polymer and the inner core or island component comprises the second polymer.

In some embodiments, the water-permeable pouch can comprise at least two nonwoven layers, each nonwoven layer comprising a plurality of heat sealable binder fibers. In certain embodiments, one of the at least two nonwoven layers can be relatively hydrophilic and one of the at least two nonwoven layers can be relatively hydrophobic. The relatively hydrophobic layer can be positioned between the composition within the cavity of the pouch and the relatively hydrophilic layer, for example. In certain embodiments, the relatively hydrophilic layer can comprise a flavor component.

Also provided herein is a method of making a nonwoven web adapted for use in making pouched products. The method can comprise blending and entangling a plurality of heat sealable binder fibers (e.g., in staple fiber form) with a second plurality of cellulosic fibers (e.g., in staple fiber form) to form a nonwoven web, the blending and entangling including carding and hydroentangling the nonwoven web, and further comprising point bonding the nonwoven web as described herein. The method can include forming a second nonwoven web, the forming step comprising blending and entangling a plurality of heat sealable binder fibers with a second plurality of cellulosic fibers to form the nonwoven web, the blending and entangling including carding and hydroentangling the fibers to form the second nonwoven web, and point bonding the second nonwoven web; and wherein the second nonwoven web is treated such that one of the two nonwoven webs is relatively hydrophilic and one of the two nonwoven webs is relatively hydrophobic; and further comprising combining the two nonwoven webs into a multi-layer composite structure.

A method for manufacturing a pouched product is also described herein. In various embodiments, the method can comprise providing a continuous supply of a pouch material, wherein the pouch material comprises a nonwoven web comprising a plurality of heat sealable binder fibers (e.g., in staple fiber form) blended with a second plurality of dissimilar fibers (e.g., in staple fiber form), the nonwoven web being carded, hydroentangled, and point bonded as described herein. The method can further comprise engaging lateral edges of the pouch material such that a longitudinally-extending seam is formed; sealing the longitudinally-extending seam such that a continuous tubular member is formed from the continuous supply of pouch material; inserting a composition adapted for oral use into the continuous tubular member; subdividing the continuous tubular member into discrete pouch portions such that each pouch portion includes a composition charge; and sealing a leading and an end edge of each discrete pouch portion such that an outer water-permeable pouch is formed that encloses the composition charge. In certain embodiments, each sealing step can comprise heating the pouch material to a melting temperature of the heat sealable binder fibers to form a seal.

In certain embodiments of the methods of the invention described herein, the weight ratio of the heat sealable binder fibers to the cellulosic fibers can be about 4:1 to about 1:4. The heat sealable binder fibers can have a melting point of less than about 230° C., or less than about 140° C. as noted herein. Furthermore, as noted herein, the heat sealable binder fibers can comprise an aliphatic polyester. In various embodiments, the heat sealable binder fibers can comprise a polymer selected from the group consisting of polyglycolic acid, polylactic acid, polyhydroxyalkanoates, polycaprolactone, polybutylene succinate, polybutylene succinate adipate, and copolymers thereof. In a preferred embodiment, the heat sealable binder fibers can comprise an aliphatic polyester, the second plurality of dissimilar fibers can comprise cellulosic fibers, and the composition adapted for oral use can be a smokeless tobacco product or nicotine replacement therapy product. In addition, the heat sealable binder fibers and the cellulosic fibers can be in staple fiber form.

In various embodiments of the method for manufacturing a pouched product described herein, the water-permeable pouch can comprise at least two nonwoven layers, each nonwoven layer typically comprising a plurality of heat sealable binder fibers, and wherein one of the at least two nonwoven layers is relatively hydrophilic and one of the at least two nonwoven layers is relatively hydrophobic. In certain embodiments, the relatively hydrophobic layer can be positioned between the composition within the cavity of the pouch and the relatively hydrophilic layer. In some embodiments, the relatively hydrophilic layer can comprise a flavor component.

BRIEF DESCRIPTION OF THE DRAWINGS

Figure 1:
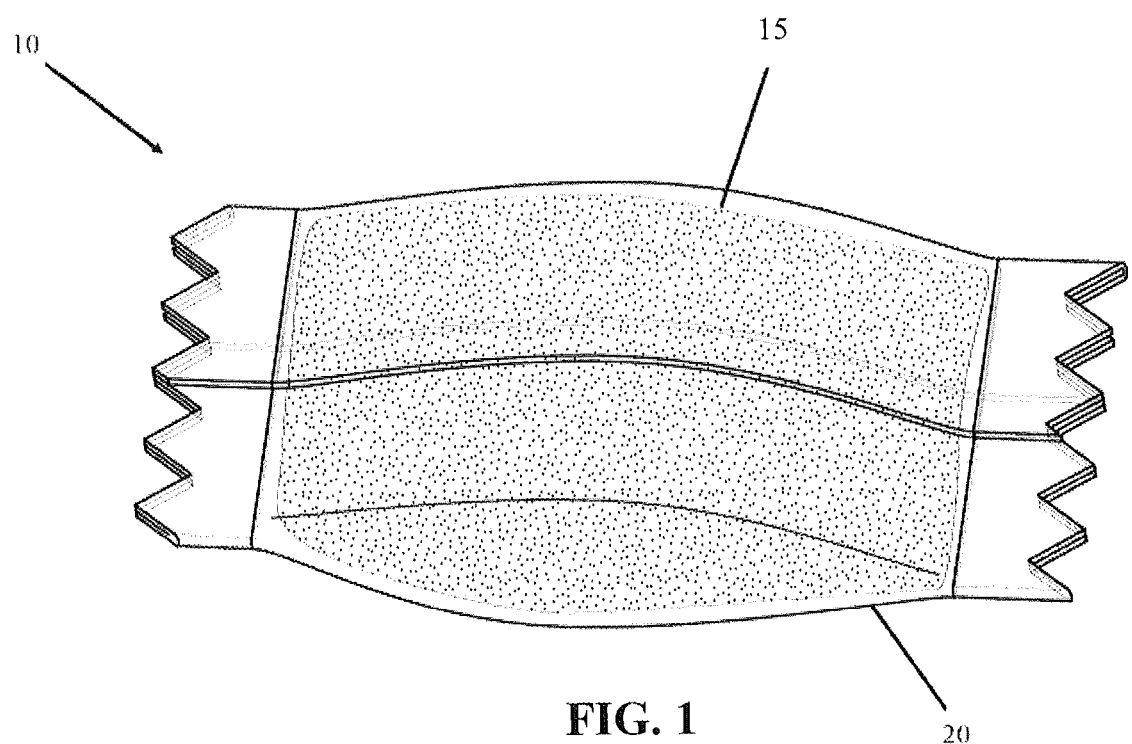
Figure 3:
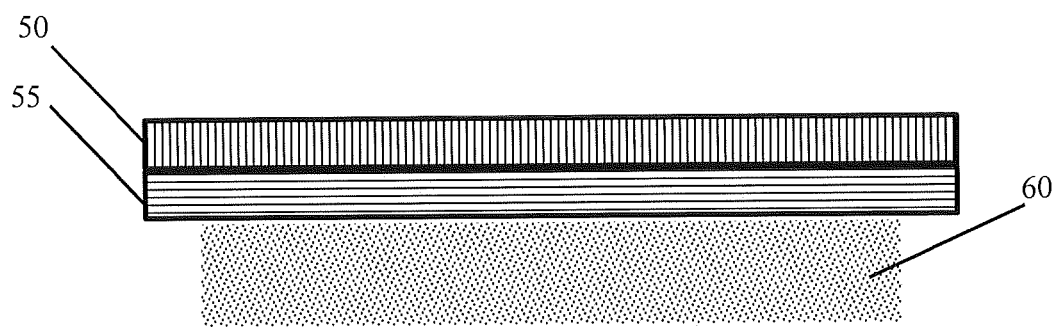
Figure 4:
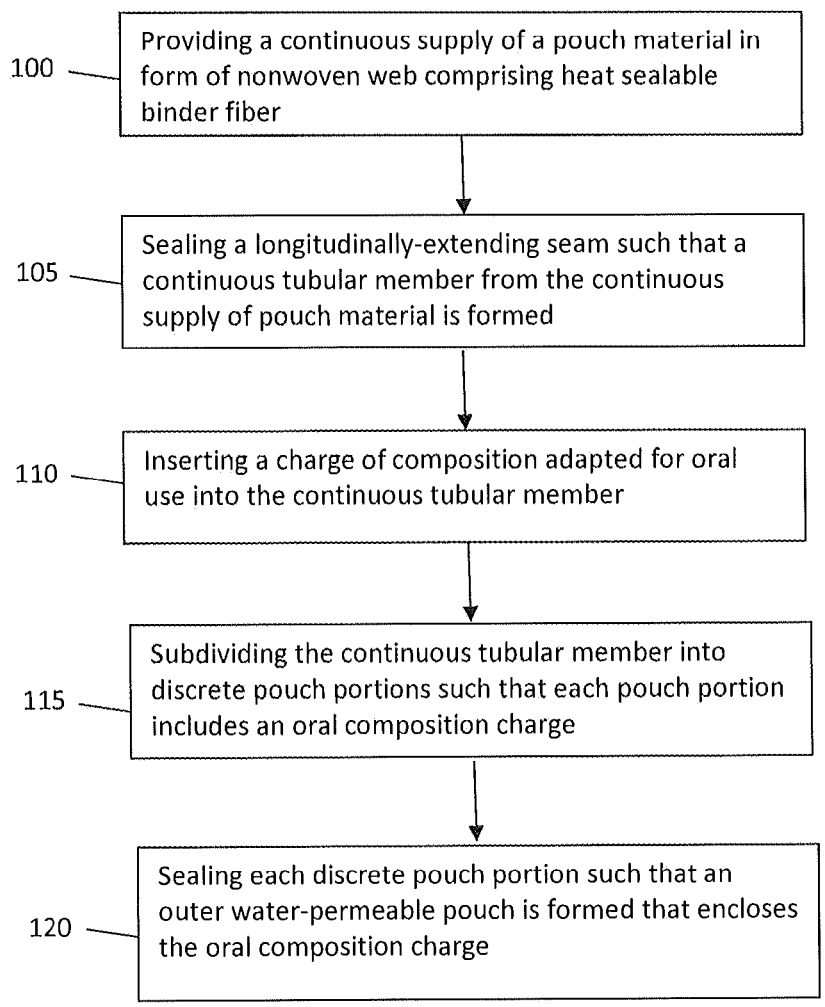

Having thus described the invention in the foregoing general terms, reference will now be made to the accompanying drawings, which are not necessarily drawn to scale, and wherein:

FIG. 1 is a front perspective view illustrating a pouched product according to an embodiment of the present invention;

FIGS. 2A through 2D are top perspective view illustrating several multi-component fiber configurations suitable for use as a heat sealable binder fiber according to the invention;

FIG. 3 is a partial cross-sectional view illustrating a pouched product comprising a layered outer pouch, wherein the layered outer pouch comprises a hydrophilic material layer and a hydrophobic material layer; and FIG. 4 is a flow chart illustrating the general steps for manufacturing a pouched product according to an embodiment of the present invention.

DETAILED DESCRIPTION OF THE INVENTION

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise.

According to various embodiments of the invention, a pouched product configured for insertion into the mouth of a user is provided. The pouched product can comprise an outer water-permeable pouch and a composition situated within the outer water-permeable pouch. The composition positioned within the pouch can be any composition containing a water-soluble component capable of being released through the water-permeable pouch, such as tea or coffee materials (e.g., in the context of a beverage pouch adapted for brewing or steeping) or compositions adapted for oral use (e.g., tobacco-derived products such as snus or nicotine replacement therapy products). In certain embodiments, the composition within the cavity of the pouch can comprise at least one of a particulate tobacco material, nicotine, particulate non-tobacco material (e.g., microcrystalline cellulose) treated to contain nicotine and/or flavoring agents, and fibrous plant material (e.g., beet pulp fiber) treated to contain a tobacco extract.

For example, as illustrated in FIG. 1, an exemplary pouched product 10 can comprise an outer water-permeable container 20 in the form of a pouch which contains a particulate mixture 15 adapted for oral use. The orientation, size, and type of outer water-permeable pouch and the type and nature of the composition adapted for oral use that are illustrated herein are not construed as limiting thereof.

In various embodiments, a moisture-permeable packet or pouch can act as a container for use of the composition within. The composition/construction of such packets or pouches, such as the container pouch 20 in the embodiment illustrated in FIG. 1, may be varied as noted herein. For example, suitable packets, pouches or containers of the type used for the manufacture of smokeless tobacco products, which can be modified according to the present invention, are available under the tradenames CatchDry, Ettan, General, Granit, Goteborgs Rape, Grovsnus White, Metropol Kaktus, Mocca Anis, Mocca Mint, Mocca Wintergreen, Kicks, Probe, Prince, Skruf and TreAnkrare. A pouch type of product similar in shape and form to various embodiments of a pouched product described herein is commercially available as ZONNIC (distributed by Niconovum AB). Additionally, pouch type products generally similar in shape and form to various embodiments of a pouched product are set forth as snuff bag compositions E-J in Example 1 of PCT WO 2007/104573 to Axelsson et al., which is incorporated herein by reference, which are produced using excipient ingredients and processing conditions that can be used to manufacture pouched products as described herein.

In various embodiments of the present invention, a nonwoven web can be used to form an outer water-permeable pouch, which can be used to house a composition adapted for oral use. During use, the user can place one pouched product containing the composition adapted for oral use in the mouth of the human subject/user. Saliva in the mouth of the user causes some of the components of the product to pass through the water-permeable pouch and into the mouth of the user. The pouch preferably is not chewed or swallowed. The user is provided with flavor and satisfaction, and is not required to spit out any portion of the product. After about 10 minutes to about 60 minutes, typically about 15 minutes to about 45 minutes, of use/enjoyment, substantial amounts of the product and have been ingested by the human subject, and the pouch may be removed from the mouth of the human subject for disposal.

The pouch provides a liquid-permeable container of a type that may be considered to be similar in character to the mesh-like type of material that is used for the construction of a tea bag. Components of the loosely arranged composition adapted for oral use readily diffuse through the pouch and into the mouth of the user. Preferred pouch materials for tobacco products may be designed and manufactured such that under conditions of normal use, a significant amount of the tobacco formulation contents permeate through the pouch material prior to the time that the pouch undergoes loss of its physical integrity. If desired, flavoring ingredients, disintegration aids, and other desired components, may be incorporated within, or applied to, the pouch material.

Various types of pouch materials and pouch manufacturing techniques are discussed in more detail below. Generally, the pouched products of the invention include a powdered or granular composition adapted for oral use (e.g., a tobacco-containing composition and/or a nicotine-containing pharmaceutical composition) that is disposed within a moisture-permeable container. That is, the composition adapted for oral use can be contained within a container, such as a pouch or bag, such as the type commonly used for the manufacture of snus types of products (e.g., a sealed, moisture permeable pouch that is sometimes referred to as a "portion").

Certain oral products of the disclosure will incorporate some form of a plant of the *Nicotiana* species, and most preferably, those compositions or products incorporate some form of tobacco. The selection of the plant from the *Nicotiana* species can vary; and in particular, the types of tobacco or tobaccos may vary. Tobaccos that can be employed include flue-cured or Virginia (e.g., K326), burley, sun-cured (e.g., Indian Kurnool and Oriental tobaccos, including Katerini, Prelip, Komotini, Xanthi and Yambol tobaccos), Maryland, dark, dark-fired, dark air cured (e.g., Passanda, Cubano, Jatin and Bezuki tobaccos), light air cured (e.g., North Wisconsin and Galpao tobaccos), Indian air cured, Red Russian and *Rustica* tobaccos, as well as various other rare or specialty tobaccos. Additional information on types of *Nicotiana* species suitable for use in the present invention can be found in US Pat. Appl. Pub. No. 2012/0192880 to Dube et al., which is incorporated by reference herein.

The portion or portions of the plant of the *Nicotiana* species used according to the present invention can vary. For example, virtually all of the plant (e.g., the whole plant) can be harvested, and employed as such. Alternatively, various parts or pieces of the plant can be harvested or separated for further use after harvest. For example, the leaves, stem, stalk, roots, lamina, flowers, seed, and various portions and combinations thereof, can be isolated for further use or treatment. The plant material of the invention may thus comprise an entire plant or any portion of a plant of the *Nicotiana* species. See, for example, the portions of tobacco plants set forth in US Pat. Appl. Pub. Nos. 2011/0174323 to Coleman, III et al. and 2012/0192880 to Dube et al., which are incorporated by reference herein.

The tobacco material can be subjected to various treatment processes such as, refrigeration, freezing, drying (e.g., freeze-drying or spray-drying), irradiation, yellowing, heating, cooking (e.g., roasting, frying or boiling), fermentation, bleaching, or otherwise subjected to storage or treatment for later use. Exemplary processing techniques are described, for example, in US Pat. Appl. Pub. Nos. 2009/0025739 to Brinkley et al. and 2011/0174323 to Coleman, III et al., which are incorporated by reference herein.

A harvested portion or portions of the plant of the *Nicotiana* species can be physically processed. In certain embodiments, the tobacco material is used in a form that can be described as particulate (i.e., shredded, ground, granulated, or powder form). The manner by which the tobacco material is provided in a finely divided or powder type of form may vary. Preferably, plant parts or pieces are comminuted, ground or pulverized into a particulate form using equipment and techniques for grinding, milling, or the like. Most preferably, the plant material is relatively dry in form during grinding or milling, using equipment such as hammer mills, cutter heads, air control mills, or the like.

In certain embodiments, at least a portion of the tobacco material employed in the tobacco composition or product can have the form of an extract. Tobacco extracts can be obtained by extracting tobacco using a solvent having an aqueous character such as distilled water or tap water. As such, aqueous tobacco extracts can be provided by extracting tobacco with water, such that water insoluble pulp material is separated from the aqueous solvent and the water soluble and dispersible tobacco components dissolved and dispersed therein. Tobacco extraction techniques and tobacco extract processing techniques are described, for example, in US Pat. Pub. No. 2013/0312774 to Holton, Jr., which is incorporated by reference herein.

In certain embodiments, the pouched products of the invention can include a nicotinic compound. Various nicotinic compounds, and methods for their administration, are set forth in US Pat. Pub. No. 2011/0274628 to Borschke, which is incorporated herein by reference. As used herein, "nicotinic compound" or "source of nicotine" often refers to naturally-occurring or synthetic nicotinic compound unbound from a plant material, meaning the compound is at least partially purified and not contained within a plant structure, such as a tobacco leaf. Most preferably, nicotine is naturally-occurring and obtained as an extract from a *Nicotiana* species (e.g., tobacco). The nicotine can have the enantiomeric form S(−)-nicotine, R(+)-nicotine, or a mixture of S(−)-nicotine and R(+)-nicotine. Most preferably, the nicotine is in the form of S(−)-nicotine (e.g., in a form that is virtually all S(−)-nicotine) or a racemic mixture composed primarily or predominantly of S(−)-nicotine (e.g., a mixture composed of about 95 weight parts S(−)-nicotine and about 5 weight parts R(+)-nicotine). Most preferably, the nicotine is employed in virtually pure form or in an essentially pure form. Highly preferred nicotine that is employed has a purity of greater than about 95 percent, more preferably greater than about 98 percent, and most preferably greater than about 99 percent, on a weight basis.

Nicotinic compounds can include nicotine in free base form, salt form, as a complex, or as a solvate. See, for example, the discussion of nicotine in free base form in US Pat. Pub. No. 2004/0191322 to Hansson, which is incorporated herein by reference. At least a portion of the nicotinic compound can be employed in the form of a resin complex of nicotine, where nicotine is bound in an ion exchange resin, such as nicotine polacrilex. See, for example, U.S. Pat. No. 3,901,248 to Lichtneckert et al., which is incorporated herein by reference. At least a portion of the nicotine can be employed in the form of a salt. Salts of nicotine can be provided using the types of ingredients and techniques set forth in U.S. Pat. No. 2,033,909 to Cox et al. and U.S. Pat. No. 4,830,028 to Lawson et al., and Perfetti, *Beitrage Tabakforschung Int.*, 12: 43-54 (1983), which are incorporated herein by reference. See, also, US Pub. No. 2011/0268809 to Brinkley et al., which is incorporated herein by reference. Additionally, salts of nicotine have been available from sources such as Pfaltz and Bauer, Inc. and K&K Laboratories, Division of ICN Biochemicals, Inc.

Representative types of excipients or other additional ingredients that are particularly useful for the manufacture of nicotine-containing products or tobacco-containing products include fillers or carriers for active ingredients (e.g., calcium polycarbophil, microcrystalline cellulose, cornstarch, beet pulp fiber, silicon dioxide or calcium carbonate), thickeners, film formers and binders (e.g., hydroxypropyl cellulose, hydroxypropyl methylcellulose, acacia, sodium alginate, xanthan gum and gelatin), buffers and pH control agents (e.g., magnesium oxide, magnesium hydroxide, potassium carbonate, sodium carbonate, potassium bicarbonate, sodium bicarbonate, or mixtures thereof), antiadherents (e.g., talc), glidants (e.g., colloidal silica), natural or artificial sweeteners (e.g., saccharin, acesulfame K, aspartame, sucralose, isomalt, lactose, mannitol, sorbitol, xylitol and sucrose), humectants (e.g., glycerin), preservatives and antioxidants (e.g., sodium benzoate and ascorbyl palmitate), surfactants (e.g., polysorbate 80), natural or artificial flavors (e.g., mint, cinnamon, cherry or other fruit flavors), dyes or pigments (e.g., titanium dioxide or D&C Yellow No. 10), and lubricants or processing aids (e.g., calcium stearate or magnesium stearate). Certain types of nicotine-containing products or tobacco-containing products also can have outer coatings composed of ingredients capable of providing acceptable outer coatings (e.g., an outer coating can be composed of ingredients such as carnauba wax, and pharmaceutically acceptable forms of shellacs, glazing compositions and surface polish agents). Adhesives, coatings, colorants, and other ingredients used in products described herein can be generally recognized as safe, non-toxic, ingestible and otherwise suitable for oral use.

The pouches of the invention are formed from fibrous nonwoven webs. As used herein, the term "fiber" is defined as a basic element of textiles. Fibers are often in the form of a rope-or string-like element. As used herein, the term "fiber" is intended to include fibers, filaments, continuous filaments, staple fibers, and the like. The term "multicomponent fibers" refers to fibers that comprise two or more components that are different by physical or chemical nature, including bicomponent fibers. Specifically, the term "multicomponent fibers" includes staple and continuous fibers prepared from two or more polymers present in discrete structured domains in the fiber, as opposed to blends where the domains tend to be dispersed, random or unstructured.

The term "nonwoven" is used herein in reference to fibrous materials, webs, mats, batts, or sheets in which fibers are aligned in an undefined or random orientation. The nonwoven fibers are initially presented as unbound fibers or filaments. An important step in the manufacturing of nonwovens involves binding the various fibers or filaments together. The manner in which the fibers or filaments are bound can vary, and include thermal, mechanical and chemical techniques that are selected in part based on the desired characteristics of the final product.

In the present invention, the need for a heat sealable binder coating on the pouch material is reduced or eliminated. Accordingly, in certain embodiments of the invention, the pouched product can be described as substantially free of a heat sealable binder coating. For example, the nonwoven web used to form the pouched product can comprise no more than about 0.5% by weight, no more than about 0.25% by weight, or no more than about 0.1% by weight (based on total weight of the nonwoven web) of a heat sealable binder coating. In some embodiments, the nonwoven web will be completely free of heat sealable binder coatings. As used herein, "heat sealable binder coatings" refers to liquid coating materials, such as acrylic polymer compositions, applied to a nonwoven web and which are capable of sealing seams of individual pouches upon heating. The absence of such heat sealable binder coatings can enhance biodegradability of the pouches and reduce cost of manufacturing by removing the need for a wet chemistry step. In addition, a heat sealable binder coating can produce an undesirable slimy mouth feel when wetted by saliva. There is also a potential for retardation of flavor transfer due to the presence of a binder coating.

The outer water-permeable pouch of the present invention utilizes a fibrous nonwoven web that includes a plurality of heat sealing binder fibers comprising a thermoplastic polymer capable of providing the function of heat sealing of the pouch. As used herein, a "binder fiber" can be a fiber of any type, size, chemistry, etc. that can be used for the purpose of undergoing softening or melting upon heating, such that the binder fiber can act as a binding agent for the nonwoven web. In a preferred embodiment, the binder fibers are staple fibers. The heat sealing binder fibers are typically mixed or blended with other dissimilar fiber types, such as conventional fibers used to form nonwoven "fleece" pouches. For example, the heat sealing binder fibers can be blended with cellulosic fibers (e.g., regenerated cellulose known as rayon or viscose fibers). In a preferred embodiment, the dissimilar fibers can also be staple fibers. Each fiber in the nonwoven web can be a homocomponent fiber.

Figure 2A:
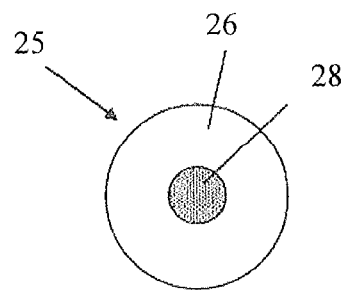
Figure 2B:
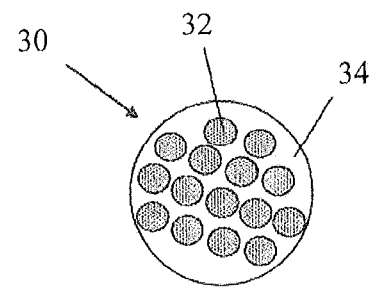
Figure 2C:
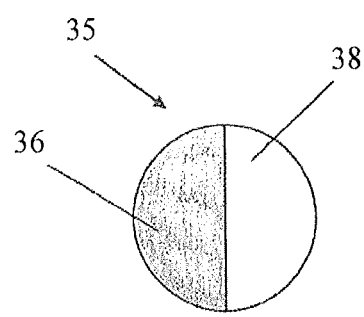
Figure 2D:
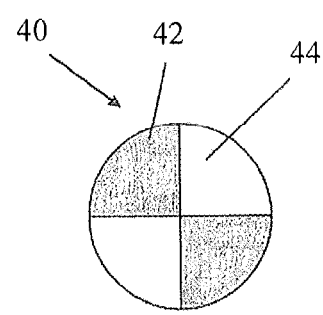

In some embodiments, all or a portion of the nonwoven web can comprise heat sealable binder fibers in the form of multicomponent fibers wherein the thermoplastic polymer adapted for use as the heat sealing binder is combined with a second polymer material. The use of multicomponent fibers can be useful to reduce cost by reducing the total amount of heat sealable binder utilized in the nonwoven web. For example, FIG. 2A illustrates a cross-sectional view of an exemplary multicomponent fiber useful in the present invention, designated generally as 25. The illustrated multicomponent fiber 25 is a sheath/core fiber that includes at least two structured components: (i) an outer sheath component 26; and (ii) an inner core component 28. FIG. 2B, for example, illustrates an embodiment wherein the multicomponent fiber 30 is a "matrix" or "islands-in-the-sea" type fiber having a plurality of inner, or "island," components 32 surrounded by an outer matrix, or "sea," component 34. The island components can be substantially uniformly or randomly arranged within the matrix of the sea component. FIG. 2C illustrates a side-by-side multicomponent fiber 35 wherein the first component 36 and the second component 38 are arranged in a side-by-side relationship. FIG. 2D illustrates an embodiment wherein the multicomponent fiber 40 is configured in a pie-wedge arrangement, wherein the first component 42 and the second component 44 are arranged as alternating wedges, the number of which can vary. Although not illustrated, other multicomponent arrangements known in the art are also contemplated in the present invention. In the present invention, at least one of the components of the multicomponent fiber exposed on the surface would include the heat sealable binder material, such as the sheath 26, the sea 34, or either of the components in FIGS. 2C and 2D.

The thermoplastic polymer of the heat sealable binder fibers (or the heat sealable binder component of a multi-component fiber) can vary. The thermoplastic polymer will exhibit a melting point in a relatively low range to facilitate heat sealing of the pouch material. For example, the thermoplastic polymer fiber will typically have a melting point of about 230° C. or less, about 200° C. or less, about 160°

C. or less, about 150° C. or less, about 140° C. or less, or about 120° C. or less. Advantageously, the thermoplastic polymer of the heat sealable binder fibers will be a biodegradable polymer, such as an aliphatic polyester. Exemplary aliphatic polyesters include polyglycolic acid (PGA), polylactic acid (PLA) (e.g., poly(L-lactic acid) or poly(DL-lactic acid)), polyhydroxyalkanoates (PHAs) such as polyhydroxypropionate, polyhydroxyvalerate, polyhydroxybutyrate, polyhydroxyhexanoate, and polyhydroxyoctanoate, polycaprolactone (PCL), polybutylene succinate, polybutylene succinate adipate, and copolymers thereof (e.g., polyhydroxybutyrate-co-hydroxyvalerate (PHBV)). In certain embodiments, heat sealable binder fibers can comprise plasticized cellulose acetate and/or calcium alginate. The heat sealable binder fibers can be found commercially or manufactured suing known melt-spinning techniques. For example, commercially available PLA fibers that can be useful in the present invention include Ecodear® from Toray of Japan; Ingeo™ based PLA fibers from Fiber Innovations Technology, USA; and PLA fibers from Trevira GmbH.

Biodegradability can be measured, for example, by placing a sample in environmental conditions expected to lead to decomposition, such as placing a sample in water, a microbe-containing solution, a compost material, or soil. The degree of degradation can be characterized by weight loss of the sample over a given period of exposure to the environmental conditions. U.S. Pat. No. 5,970,988 to Buchanan et al. and U.S. Pat. No. 6,571,802 to Yamashita provide exemplary test conditions for degradation testing. The degradability of a plastic material also may be determined using one or more of the following ASTM test methods: D5338, D5526, D5988, and D6400.

The additional fiber types blended with the heat sealable binder fibers in certain embodiments of the invention can vary. Exemplary fibers include those made of wool, cotton, fibers made of cellulosic material, such as regenerated cellulose, cellulose acetate, cellulose triacetate, cellulose nitrate, ethyl cellulose, cellulose acetate propionate, cellulose acetate butyrate, hydroxypropyl cellulose, methyl hydroxypropyl cellulose, protein fibers, and the like. See also, the fiber types set forth in US Pat. Appl. Pub. No. 2014/0083438 to Sebastian et al., which is incorporated by reference herein.

Regenerated cellulose fibers are particularly advantageous, and are typically prepared by extracting non-cellulosic compounds from wood, contacting the extracted wood with caustic soda, followed by carbon disulfide and then by sodium hydroxide, giving a viscous solution. The solution is subsequently forced through spinneret heads to create viscous threads of regenerated fibers. Exemplary methods for the preparation of regenerated cellulose are provided in U.S. Pat. No. 4,237,274 to Leoni et al; U.S. Pat. No. 4,268,666 to Baldini et al; U.S. Pat. No. 4,252,766 to Baldini et al.; U.S. Pat. No. 4,388,256 to Ishida et al.; U.S. Pat. No. 4,535,028 to Yokogi et al.; U.S. Pat. No. 5,441,689 to Laity; U.S. Pat. No. 5,997,790 to Vos et al.; and U.S. Pat. No. 8,177,938 to Sumnicht, which are incorporated herein by reference. The manner in which the regenerated cellulose is made is not limiting, and can include, for example, both the rayon and the TENCEL processes. Various suppliers of regenerated cellulose are known, including Lenzing (Austria), Cordenka (Germany), Aditya Birla (India), and Daicel (Japan).

In multicomponent fiber embodiments where the heat sealable binder fibers are formed using a heat sealable polymer as described above in combination with one or more additional polymers, the additional polymers can vary and will typically exhibit a melting point substantially greater than the heat sealable binder material, such as greater than about 200° C., greater than about 220° C., greater than about 240° C. The melting point of the additional polymer component could also be characterized in terms of the difference in melting point between the additional polymer and the heat sealable binder polymer, such as a difference of at least about 10° C., at least about 20° C., at least about 40° C., or at least about 60° C. Examples include various polyester, polyurethane, or polyamide polymers, as well as rayon. Advantageously, the additional polymers will exhibit a high degree of biodegradability. For example, in certain embodiments, a multicomponent heat sealable binder fiber can comprise a first PLA with a first melting point and a second PLA with a second melting point, wherein the first melting point is lower than the second melting point. In some embodiments, a multicomponent heat sealable binder fiber can comprise PLA and polyhydroxyalkanoates (PHA).

The amount of heat sealable binder fibers present in the nonwoven web of the invention can vary and will depend in part on the desired application for the nonwoven web, the heat sealing equipment to be used, and the type of heat sealable polymer present in the binder fibers. Typically, the heat sealable binder fibers (whether in homocomponent or multicomponent form) will comprises at least about 20% by weight, at least 30% by weight, at least 40% by weight, or least about 50% by weight, based on the total weight of the nonwoven web. The heat sealable binder fibers will typically be used in a blended form, meaning the heat sealable binder fibers will be present in an amount of less than about 90% by weight, or less than about 80% by weight, or less than about 70% by weight. Typical weight ratios of the heat sealable binder fibers to the other fiber types in the nonwoven web include about 4:1 to about 1:4, about 3:1 to about 1:3, or more typically about 2:1 to about 1:2. A 1:1 ratio is used in one embodiment.

The fibers used in the nonwoven web according to the present invention can vary, and include fibers having any type of cross-section, including, but not limited to, circular, rectangular, square, oval, triangular, and multilobal. In certain embodiments, the fibers can have one or more void spaces, wherein the void spaces can have, for example, circular, rectangular, square, oval, triangular, or multilobal cross-sections. As noted previously, the fibers can be selected from single-component (i.e., uniform in composition throughout the fiber) or multicomponent fiber types including, but not limited to, fibers having a sheath/core structure and fibers having an islands-in-the-sea structure, as well as fibers having a side-by-side, segmented pie, segmented cross, segmented ribbon, or tipped multilobal cross-sections.

The physical parameters of both the heat sealable binder fibers and the additional fibers present in the nonwoven web of the invention can vary. For example the fibers used in the nonwoven web can have varying size (e.g., length, dpf) and crimp characteristics. In some embodiments, fibers used in the nonwoven web can be nano fibers, sub-micron fibers, and/or micron-sized fibers. In certain embodiments, fibers useful herein can measure about 1.5 dpf to about 2.0 dpf, or about 1.6 dpf to about 1.90 dpf. In a preferred embodiment, each fiber can be a staple fiber. Each fiber length can measure about 35 mm to about 60 mm, or about 38 mm to about 55 mm, for example. In various embodiments, each fiber can measure about 4-10 crimps per cm, or about 5-8 crimps per cm. It is advantageous for all fibers in the nonwoven web to have similar fiber size and crimp attributes to ensure favorable blending and orientation of the fibers in the nonwoven web.

The means of producing the nonwoven web can vary. Web formation can be accomplished by any means known in the art. Web formation will typically involve a carding step, which involves deposition of the fibers (e.g., the heat sealable binder fibers and any additional fibers) onto a surface followed by aligning/blending the fibers in a machine direction. Thereafter, the nonwoven web is typically subjected to some type of bonding/entanglement including, but not limited to, thermal fusion or bonding, mechanical entanglement, chemical adhesive, or a combination thereof. In one embodiment, the nonwoven web is bonded thermally using a calendar (which can provide flat or point bonding), steam jet bonding, or a thru-air oven. Additional bonding methods include ultrasonic bonding and crimping. In some embodiments, needle punching is utilized, wherein needles are used to provide physical entanglement between fibers. In one embodiment, the web is entangled using hydroentanglement, which is a process used to entangle and bond fibers using hydrodynamic forces.

For example, in certain embodiments, the nonwoven web is made by a fleece carding process with point bonding. The point bonding (e.g., using a calendar) should be limited to a relatively small portion of the surface area of the nonwoven web to maintain good porosity in the web for migration of water-soluble components through the web during oral use. In certain embodiments, the point bonding is limited to less than about 60% of the surface area of the nonwoven web (or resulting pouch), such as less than about 50%, less than about 30%, or less than about 20% (e.g., about 1% to about 50%, about 5% to about 40%, or about 10% to about 30%). An advantage of point bonding is the ability to control the porosity, flexibility and fabric strength.

In other embodiments, the nonwoven web can be subjected to hydroentangling. The term "hydroentangled" or "spunlaced" as applied to a nonwoven fabric herein defines a web subjected to impingement by a curtain of high speed, fine water jets, typically emanating from a nozzle jet strip accommodated in a pressure vessel often referred to as a manifold or an injector. This hydroentangled fabric can be characterized by reoriented, twisted, turned and entangled fibers. For example, the fibers can be hydroentangled by exposing the nonwoven web to water pressure from one or more hydroentangling manifolds at a water pressure in the range of about 10 bar to about 1000 bar. As compared to point bonding, spunlace technology, in certain embodiments, will have less impact on porosity of the web and, thus, may enhance flavor transfer through the nonwoven pouch material.

In various embodiments, the nonwoven web can be subjected to a second bonding method in order to reduce elongation of the web during processing. In certain embodiments, carded and hydroentangled nonwoven webs of the invention can exhibit significant elongation during high speed processing on pouching equipment. Too much elongation of the nonwoven web can cause the web to shrink during processing, such that the final product is not sized appropriately. As such, it can be necessary to modify process equipment to fit a wider roll of fleece, for example, to compensate for any shrinkage in the final product due to elongation.

In order to avoid or at least reduce such an elongation problem, in various embodiments the nonwoven web can be point bonded after the first bonding (e.g., hydroentangling) is completed. A second bonding process can increase the tensile strength of the nonwoven web and reduce elongation characteristics. In particular, a point bonding process can bond a nonwoven web by partially or completely melting the web (e.g., the heat sealable binder fibers) at discrete points. For example, in some embodiments, the nonwoven web can be subjected to ultrasonic bonding after initial bonding of the web. Any ultrasonic bonding system for nonwoven materials known in the art can be used to ultrasonically bond the nonwoven web. See, for example, the apparatuses and devices disclosed in U.S. Pat. No. 8,096,339 to Aust and U.S. Pat. No. 8,557,071 to Weiler, incorporated by reference herein. In some embodiments, the nonwoven web can be subjected to point bonding via embossed and/or engraved calendar rolls, which are typically heated. See, e.g., the point bonding methods incorporating the use of very high calendar pressures and embossing techniques discussed in U.S. Pat. Publ. No. 2008/0249492 to Schmidt, herein incorporated by reference in its entirety. The point bonding process is typically limited to less than about 60% of the surface area of the nonwoven web as noted above.

In certain embodiments, the processing techniques used to blend, entangle and bond the nonwoven web can also impart a desired texture to the fibrous nonwoven web material. For instance, point bonding or hydroentangling can impart a desired texture (e.g. a desired pattern) to the nonwoven web. This textured pattern can include product identifying information. In some embodiments, the product identifying information is selected from the group consisting of product brand, a company name, a corporate logo, a corporate brand, a marketing message, product strength, active ingredient, product manufacture date, product expiration date, product flavor, product release profile, weight, product code (e.g., batch code), other product differentiating markings, and combinations thereof.

The fibrous webs can have varying thicknesses, porosities and other parameters. The nonwoven web can be formed such that the fiber orientation and porosity of the pouched product formed therefrom can retain the composition adapted for oral use that is enclosed within the outer water-permeable pouch, but can also allow the flavors of the composition to be enjoyed by the consumer. For example, in some embodiments, the fibrous webs can have a basis weight of about 20 gsm to about 35 gsm, or about 25 gsm to about 30 gsm. In a preferred embodiment, the fibrous web can have a basis weight of about 28 gsm. Basis weight of a fabric can be measured using ASTM D3776/D3776M-09a (2013) (Standard Test Methods for Mass Per Unit Area (Weight) of Fabric), for example. In various embodiments, the fibrous web can have a thickness of about 0.1 mm to about 0.15 mm (e.g., about 0.11 mm). The fibrous web can have an elongation of about 70% to about 80%, e.g., about 78%. In some embodiments, the fibrous web can have a peak load of about 4 lbs. to about 8 lbs., e.g., about 5.5 lbs. Elongation and breaking strength of textile fabrics can be measured using ASTM D5034-09(2013) (Standard Test Method for Breaking Strength and Elongation of Textile Fabrics (Grab Test)), for example. In various embodiments, the fibrous web can have a Tensile Energy Absorption (TEA) of about 35 to about 40, e.g., about 37. In certain embodiments, the fibrous web can have a porosity of greater than about 10,000 ml/min/cm$^2$. TEA can be measured, for example, as the work done to break the specimen under tensile loading per lateral area of the specimen. Porosity, or air permeability of textile fabrics can be measured using ASTM D737-04(2012) (Standard Test method for Air Permeability of Textile Fabrics), for example.

In various embodiments of the pouched product described herein, the outer water-permeable pouch is made from a nonwoven web as described above. In some embodiments, pouch is constructed of a single layer of the nonwoven web.

In various embodiments, the pouch material comprises a multilayer composite made up of two or more nonwoven layers. Each nonwoven layer can be formed by processes discussed above. In a multilayer structure, as illustrated in FIG. 3 for example, a first layer 50 can be relatively hydrophilic and a second layer 55 can be relatively hydrophobic (compared to each other). In some embodiments, an outer water-permeable pouch can comprise an outer hydrophilic layer 50 and an inner hydrophobic layer 55 that can be in contact with the composition adapted for oral use 60. As such, the hydrophobic layer can, during storage of the pouched product, retain any moisture in the composition adapted for oral use such that flavors in the composition are not lost due to moisture loss. However, capillaries in the hydrophobic layer can wick out moisture into the mouth of the user, such that flavors are released into the oral cavity when used. In this manner, the pouch material can enhance storage stability without significantly compromising the enjoyment of the product by the end user. In less preferred embodiments, the relatively hydrophilic layer could be located on the interior of the multi-layer structure. The two layers can be formed into a multi-layer composite nonwoven material using any means known in the art, such as by attaching the two layers together using adhesive or stitching. The hydrophobicity of a textile material can be evaluated, for example, by measuring the contact angles between a drop of liquid and the surface of a textile material, as is known in the art.

In certain embodiments, an outer hydrophilic layer can comprise a flavor component (such as any of the flavor components noted herein), which can be applied to the nonwoven layer in any conventional manner such as by coating, printing, and the like. In some embodiments, the flavor within an outer hydrophilic layer can differ from a flavor contained within the internal composition adapted for oral use. By having a hydrophobic layer between the inner composition and the outer hydrophilic layer, the different flavors can be prevented from blending because the hydrophobic layer can prevent moisture from leaving the inner composition until enough moisture from the mouth of the user overwhelms the hydrophobic layer and thereby allows moisture to enter and leave the inner area of the pouched product where the composition is housed. By the time this takes place, the flavor component of the outer hydrophilic layer can have dissipated. In this manner, the product can be designed to provide multiple, different sensory experiences, a first sensory experience where the flavor in the outer layer transitions into the mouth of the user and a second sensory experience, typically occurring later in time, where the flavor of the internal composition transitions into the mouth of the user.

The hydrophilic and hydrophobic layers are typically formed from similar nonwoven web compositions (e.g., both are constructed of a blend of viscose fibers with heat sealable binders fiber such as PLA fibers), but wherein one of the nonwoven webs is treated to enhance either hydrophobicity or hydrophilicity. For example, a layer of the nonwoven web can be treated with a wet chemical solution to confer hydrophilicity thereupon. In one such process, a nonwoven web layer is treated with an aqueous alcohol solution containing a food-grade surfactant. The surfactant may include, for example one or more of sorbitan aliphatic acid ester, polyglycerin aliphatic acid ester, or sucrose aliphatic acid ester (see, e.g., U.S. Pat. No. 7,498,281 to Iwasaki et al., which is incorporated herein by reference). In some embodiments, the fleece fabric layers can be made hydrophilic or hydrophobic by changing the cellulose fiber chosen. For example, predominantly hydrophobic cellulose fibers are commercially available as Tencel® Biosoft from Lenzing of Austria and as Olea Fiber from Kelheim of Germany. In various embodiments, the hydrophilic layer can incorporate cationic or anionic cellulose fibers that are also available from Kelheim of Germany, for example. The hydrophilic layer can contain additives such as polyethylene glycols, methyl cellulose, hydroxypropylmethyl cellulose, hydroxypropyl cellulose, hydroxypropylmethyl cellulose phthalate, polyvinyl pyrrolidone, polyvinyl alcohol, polyacrylic acids, gelatins, alginates, sulfosuccinates, and combinations thereof.

Various manufacturing apparatuses and methods can be used to create a pouched product described herein. For example, US Publication No. 2012/0055493 to Novak, III et al., previously incorporated by reference in its entirety, relates to an apparatus and process for providing pouch material formed into a tube for use in the manufacture of smokeless tobacco products. Similar apparatuses that incorporate equipment for supplying a continuous supply of a pouch material (e.g., a pouch processing unit adapted to supply a pouch material to a continuous tube forming unit for forming a continuous tubular member from the pouch material) can be used to create a pouched product described herein. Representative equipment for forming such a continuous tube of pouch material is disclosed, for example, in U.S. Patent Application Publication No. US 2010/0101588 to Boldrini et al., which is incorporated herein by reference in its entirety. The apparatus further includes equipment for supplying pouched material to the continuous tubular member such that, when the continuous tubular member is subdivided and sealed into discrete pouch portions, each pouch portion includes a charge of a composition adapted for oral use. Representative equipment for supplying the filler material is disclosed, for example, in U.S. Patent Application Publication No. US 2010/0018539 to Brinkley, which is incorporated herein by reference in its entirety. In some instances, the apparatus may include a subdividing unit for subdividing the continuous tubular member into individual pouch portions and, once subdivided into the individual pouch portions, may also include a sealing unit for sealing at least one of the ends of each pouch portion. In other instances, the continuous tubular member may be sealed into individual pouch portions with a sealing unit and then, once the individual pouch portions are sealed, the continuous tubular member may be subdivided into discrete individual pouch portions by a subdividing unit subdividing the continuous tubular member between the sealed ends of serially-disposed pouch portions. Still in other instances, sealing (closing) of the individual pouch portions of the continuous tubular member may occur substantially concurrently with the subdivision thereof, using a closing and dividing unit.

An exemplary apparatus for manufacturing an oral pouch product is illustrated in FIGS. 1-5 of U.S. Publication No. 2012/0055493 to Novak, III et al.; however, this apparatus is used in a generic and descriptive sense only and not for purposes of limitation. It should also be appreciated that the following manufacturing process and related equipment is not limited to the process order described below. In various embodiments of the present invention, an apparatus similar to that described in U.S. Publication No. 2012/0055493 can be configured to removably receive a first bobbin on an unwind spindle assembly, the first bobbin having a continuous length of a material, such as a pouch material, wound thereon. When the first bobbin is engaged with the apparatus, the pouch material can be routed from the first bobbin to a forming unit configured to form a continuous supply of the pouch material into a continuous tubular member defining a longitudinal axis.

As such, as the pouch material is unwound from the first bobbin, the pouch material can be directed around an arrangement of roller members, otherwise referred to herein as a dancer assembly. A forming unit can be configured to cooperate with the first bobbin and the dancer assembly to take up slack in the pouch material and to maintain a certain amount of longitudinal tension on the pouch material as the pouch material is unwound from the first bobbin and fed to the forming unit, for example, by a drive system. One of ordinary skill in the art will appreciate that, between the first bobbin and the forming unit, the pouch material can be supported, routed, and/or guided by a suitably aligned series of any number of, for example, idler rollers, guideposts, air bars, turning bars, guides, tracks, tunnels, or the like, for directing the pouch material along the desired path. Typical bobbins used by conventional automated pouch making apparatuses often contain a continuous strip of pouch material of which the length may vary. As such, the apparatus described herein can be configured so as to handle bobbins of that type and size.

The forming unit can include one or more roller members configured to direct the pouch material about a hollow shaft such that the continuous supply of the pouch material can be formed into a continuous tubular member. The forming unit can include a sealing device configured to seal, fix, or otherwise engage lateral edges of the pouch material to form a longitudinally-extending seam, thereby forming a longitudinally-extending continuous tubular member. In various embodiments, an insertion unit can be configured to introduce charges of the composition adapted for oral use into the continuous tubular member through the hollow shaft. The insertion unit may be directly or indirectly engaged with the hollow shaft.

A leading edge or end (also referred to as a laterally-extending seam) of the continuous tubular member can be closed/sealed such that a charge of composition adapted for oral use inserted by the insertion unit, is contained within the continuous tubular member proximate to the leading end. The leading end can be closed/sealed via a closing and dividing unit configured to close/seal a first portion of the continuous tubular member to form the closed leading end of a pouch member portion. The closing and dividing unit can also be configured to form a closed trailing edge or end of a previous pouch member portion. In this regard, the closing and dividing unit can also be configured to close a second portion of the continuous tubular member to form the closed trailing end of the pouch member portion. In this regard, the closing and dividing unit can close the ends, by heat-sealing, or other suitable sealing mechanism.

As discussed above, a binder coating is not necessary for embodiments of the present invention. Instead, a heat sealable binder fiber incorporated into the nonwoven web of the pouch material can act as a heat sealable binder to seal the pouch once the composition adapted for oral use is inserted within the outer water-permeable pouch.

As illustrated in FIGS. 20-22 of U.S. Publication No. 2012/0055493 to Novak, III et al., the closing and dividing unit can be configured to divide the continuous tubular member, between the closed trailing end and the closed leading end of serially-disposed pouch member portions, along the longitudinal axis of the continuous tubular member, and into a plurality of discrete pouch member portions such that each discrete pouch member portion includes a portion of the oral composition from the insertion unit. In this regard, the closing and dividing unit can include a blade, heated wire, or other cutting arrangement for severing the continuous tubular member into discrete pouch member portions. For example, the closing and dividing unit can include first and second arm members configured to interact to close and divide the continuous tubular member.

In operation, a charge of the composition adapted for oral use (i.e., an amount suitable for an individual pouch member portion) can be supplied to the pouch member portion by an insertion unit after a leading end has been closed, but prior to the closing of a trailing end. In various embodiments, after receiving the charge of the oral composition, the discrete individual pouch member portion can be formed by closing the trailing end and severing the closed pouch member portion from the continuous tubular member such that an individual pouched product is formed.

The amount of material contained within each pouch may vary. In smaller embodiments, the dry weight of the material within each pouch is at least about 50 mg to about 150 mg. For a larger embodiment, the dry weight of the material within each pouch preferably does not exceed about 300 mg to about 500 mg. In some embodiments, each pouch/container may have disposed therein a flavor agent member, as described in greater detail in U.S. Pat. No. 7,861,728 to Holton, Jr. et al., which is incorporated herein by reference. For example, at least one flavored strip, piece or sheet of flavored water dispersible or water soluble material (e.g., a breath-freshening edible film type of material) may be disposed within each pouch along with or without at least one capsule. Such strips or sheets may be folded or crumpled in order to be readily incorporated within the pouch. See, for example, the types of materials and technologies set forth in U.S. Pat. No. 6,887,307 to Scott et al. and U.S. Pat. No. 6,923,981 to Leung et al.; and The EFSA Journal (2004) 85, 1-32; which are incorporated herein by reference.

In various embodiments, the nonwoven web can be sufficiently tacky so as to create issues with high-speed pouching equipment. Therefore, in certain embodiments, a Teflon coating, or similar material, can be applied to one or more surfaces of the pouching equipment that touch the nonwoven web such as, for example, rollers, cutting instruments, and heat sealing devices in order to reduce and/or alleviate any problems associated with the pouch material sticking to the pouching equipment during processing.

As illustrated in FIG. 4, for example, a method of manufacturing a pouched product can comprise a number of general, non-limiting operations that can be performed in any desirable order. At operation 100, a continuous supply of a pouch material in the form of a nonwoven web comprising a heat sealable binder fiber can be provided. At operation 105, the pouch material is formed into a continuous tubular member by sealing the lateral edges of the pouch material such that a longitudinally-extending seam is formed. As noted herein, the seam can be formed by applying conventional heat sealing techniques to the pouch material, resulting in softening and/or melting of the heat sealable binder fiber in the nonwoven web to form a seal. At operation 110, a charge of a composition adapted for oral use can be inserted into the continuous tubular member. At operation 115, the continuous tubular member can be subdivided at predetermined intervals so as to form a plurality of pouch member portions, wherein each pouch member portion includes a charge of the composition. At operation 120, each discrete pouch portion can be entirely sealed such that an outer water-permeable pouch is formed that encloses the composition. This second sealing step can involve applying conventional heat sealing techniques to the pouch material, resulting in softening and/or melting of the heat sealable binder fiber in the nonwoven web to form a seal. Accordingly, aspects of the present disclosure are particularly configured to provide discrete pouched products. The operations described and the order of the method steps illustrated herein are not construed as limiting thereof.

The pouched products can further include product identifying information printed or dyed on the outer water-permeable pouch or imprinted (e.g., embossed, debossed, or otherwise pressed) on the outer water-permeable pouch, such as described in U.S. patent application Ser. No. 13/792,926 to Reddick et al., filed Mar. 11, 2013, which is incorporated by reference herein. As noted above, flavorants can also be incorporated into the nonwoven web if desired, such as by coating or printing an edible flavorant ink onto the nonwoven web. See, e.g., U.S. Pat. Appl. Pub. Nos. 2012/0085360 to Kawata et al. and 2012/0103353 to Sebastian et al., each of which is herein incorporated by reference.

Experimental

Aspects of the present invention are more fully illustrated by the following examples, which are set forth to illustrate certain aspects of the present invention and is not to be construed as limiting thereof.

EXAMPLE 1

The following non-limiting example describes how a nonwoven web and pouch can be made with monocomponent PLA fibers as the heat sealable binder fiber.

PLA and Rayon fibers are provided having 1.5 dtex, 40 mm length, 7 crimp/cm and 4 g/den tenacity. The fibers are blended in varying ratios by weight (PLA:Rayon). Each blended fiber is carded, which produces webs with parallel fiber orientation. The PLA and Rayon blended material is thermally bonded with heated calendar rolls with an embossed pattern to apply pressure at controlled areas of the fleece. Less than 30% of the fleece is point bonded.

The fabric is heat sealed. The heat seal is measured in the machine direction using a peel test. It is found that a higher percentage of PLA results in a stronger heat seal.

EXAMPLE 2

The following non-limiting example describes how a nonwoven web can be made with blended PLA fibers as the heat sealable binder fiber.

PLA: Viscose fibers are provided having 1.5 dtex, 40 mm length, 7 crimp/cm and 4 g/den tenacity. The fibers are blended in the following ratios by weight (PLA: Viscose): (a) 50:50; and (b) 60:40. The fleece fabric target weight is 30 gsm.

Each blended fiber is carded on a Erko Trützschler Card machine.

Each blended fiber is hydroentangled with a machine having 1 pre-wetting nozzle and 4 bonding injectors (nozzles). The size of the nozzles change from 7-14 microns. Pressure is 15 bars for pre-wetting and 0-130 bars for bonding nozzles. The hydroentangling machine can include embossed drum surfaces and/or aperture drum surfaces. For fabrics with a basis weight of about 30 gsm, the line speed is 100 m/min. For fabrics with a basis weight of about 90 gsm, the line speed is 30 m/min.

The hydroentangled web then undergoes an ultrasonic point bonding process such that the tensile strength of the web is improved and elongation is reduced.

EXAMPLE 3

The following non-limiting example describes pouches formed from the hydroentangled web formed according to Example 2 above.

Rolls of the hydroentangled fabric made according to Example 2 above and measuring about 30-31 mm in width are provided. Pouches are formed from the nonwoven fabric on a Merz machine.

The pouches are able to be sealed appropriately. However, the nonwoven fabrics incorporating the PLA heat sealable binder encountered elongation and shrinkage problems. Accordingly, rolls of the nonwoven fabric measuring about 41 mm-45 mm in width are used to account for the fabric shrinkage. In addition, one or more surfaces of the pouching equipment that come in contact with the nonwoven material (e.g., rollers, cutting instruments, sealing devices, etc.) can be coated with Teflon to counteract any tackiness or stickiness that may be associated with certain embodiments of the nonwoven fabric of the invention.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A pouched product adapted for release of a water-soluble component therefrom, comprising an outer water-permeable nonwoven fleece pouch defining a cavity containing a composition comprising at least one water-soluble component capable of being released through the water-permeable pouch, wherein the composition comprises at least one filler, a resin complex of nicotine, and a further component selected from a second nicotine source and sodium benzoate, wherein the outer water-permeable nonwoven fleece pouch comprises at least two nonwoven layers, and wherein one of the at least two nonwoven layers is hydrophilic and one of the at least two nonwoven layers is hydrophobic, and wherein the outer water-permeable nonwoven fleece pouch comprises a plurality of heat sealable binder fibers blended with a second plurality of cellulosic fibers.

2. The pouched product of claim 1, wherein the further component is a second nicotine source selected from nicotine in free base form and a nicotine salt.

3. The pouched product of claim 2, further comprising sodium benzoate.

4. The pouched product of claim 1, wherein the further component is sodium benzoate.

5. The pouched product of claim 1, further comprising at least one binder.

6. The pouched product of claim 5, wherein the binder is selected from the group consisting of hydroxypropyl cellulose, hydroxypropyl methylcellulose, acacia, sodium alginate, xanthan gum and gelatin.

7. The pouched product of claim 1, wherein the composition further comprises one or more components selected from the group consisting of buffers and pH control agents, humectants, and natural or artificial sweeteners.

8. The pouched product of claim 1, wherein the composition further comprises xylitol.

9. The pouched product of claim 1, wherein the composition comprises one or both of sodium carbonate and sodium bicarbonate.

10. The pouched product of claim 1, wherein the resin complex of nicotine comprises nicotine polacrilex.

11. The pouched product of claim 1, wherein the filler is selected from the group consisting of calcium polycarbophil, microcrystalline cellulose, cornstarch, beet pulp fiber, silicon dioxide, calcium carbonate.

12. The pouched product of claim 1, wherein the filler comprises microcrystalline cellulose.

13. The pouched product of claim 1, wherein the composition within the pouch has a dry weight of about 50 mg to about 500 mg.

14. A pouched product adapted for release of a water-soluble component therefrom, comprising an outer water-permeable nonwoven fleece pouch defining a cavity containing a composition comprising at least one water-soluble component capable of being released through the water-permeable pouch, wherein the composition comprises microcrystalline cellulose, nicotine polacrilex, and a second nicotine source selected from nicotine in free base form and a nicotine salt, wherein the outer water-permeable nonwoven fleece pouch comprises at least two nonwoven layers, and wherein one of the at least two nonwoven layers is hydrophilic and one of the at least two nonwoven layers is hydrophobic, and wherein the outer water-permeable nonwoven fleece pouch comprises a plurality of heat sealable binder fibers blended with a second plurality of cellulosic fibers.

15. The pouched product of claim 14, wherein the composition further comprises sodium benzoate.

16. The pouched product of claim 14, wherein the composition further comprises one or both of sodium carbonate and sodium bicarbonate.

17. The pouched product of claim 14, wherein the composition further comprises xylitol.

18. A pouched product adapted for release of a water-soluble component therefrom, comprising an outer water-permeable nonwoven fleece pouch defining a cavity containing a composition comprising at least one water-soluble component capable of being released through the water-permeable pouch, wherein the outer water-permeable nonwoven fleece pouch comprises at least two nonwoven layers, and wherein one of the at least two nonwoven layers is hydrophilic and one of the at least two nonwoven layers is hydrophobic, wherein the outer water-permeable nonwoven fleece pouch comprises a plurality of heat sealable binder fibers blended with a second plurality of cellulosic fibers, and wherein the composition comprises:

microcrystalline cellulose;

a mixture of nicotine polacrilex and a second nicotine source selected from nicotine in free base form and a nicotine salt;

sodium benzoate, and at least one buffer or pH control agent.

19. The pouched product of claim 18, wherein the at least one buffer or pH control agent comprises one or both of sodium carbonate and sodium bicarbonate.

20. The pouched product of claim 18, wherein the composition further comprises xylitol.

\* \* \* \* \*